(12) United States Patent
Gillett et al.

(10) Patent No.: US 6,240,182 B1
(45) Date of Patent: May 29, 2001

(54) REVERSIBLE BASE WITH POSITIVE LOCK CONDITION

(75) Inventors: James Gillett, Fountaintown, IN (US); Francisco Javier Ramirez Aldana, Guadalajara (MX)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/138,882

(22) Filed: Aug. 24, 1998

(51) Int. Cl.$^7$ .................................................. H04M 1/00
(52) U.S. Cl. ........................................................ 379/435
(58) Field of Search .................................... 379/435, 436, 379/428, 446, 454, 455

(56) References Cited

U.S. PATENT DOCUMENTS 5,432,836 * 7/1995 Jarrett ..................................... 379/435

FOREIGN PATENT DOCUMENTS 61-26352 * 2/1986 (JP) ...................................... 379/435

* cited by examiner

*Primary Examiner*—Jack Chiang
(74) *Attorney, Agent, or Firm*—Priest & Goldstein, PLLC

(57) ABSTRACT

A telephone set having a reversible base which can be rotated to facilitate desktop or wall mounting. The reversible base includes tabs which are inserted into slots in a housing, the housing having a first pair of slots oriented for installation of the base in a desktop configuration and a second pair of slots oriented for installation of the base in a wall-mount configuration. Positive locking is achieved by a set of ramps and a protrusion adjacent to each slot, such that a tab sides up the ramps and over the protrusion to lock into place.

17 Claims, 4 Drawing Sheets

REVERSIBLE BASE WITH POSITIVE LOCK CONDITION

FIELD OF THE INVENTION

The present invention relates generally to improvements to housings for telephone sets. More particularly, the invention relates to an improved reversible base which can be easily removed and reversed for selection of desk or wall mounting of a telephone set.

BACKGROUND OF THE INVENTION

In order to provide greater versatility for a user, it is advantageous to design a telephone set with a base which can be removed and reversed in order to adapt the set for desk-mounting or wall-mounting, at the option of the user. Typical reversible bases of the prior art require the customer to release one or more snaps for removal and then to reapply the snaps for reinstallation. The need to release and reapply the snaps constitutes an inconvenience for the user which it would be desirable to avoid.

There exists, therefore a need in the art for a reversible telephone base in which the removal and reinstallation can be accomplished with a minimum of difficulty, without a need to release or reapply fasteners.

SUMMARY OF THE INVENTION

A telephone set according to the present invention includes a reversible base having alignment tabs for insertion into a pair of matching slots on a housing. The housing includes first and second pairs of matching slots. The pairs of matching slots have opposite orientations to one another. The first pair of matching slots is adapted for installation of the reversible base in a desk mounting orientation. The second pair of matching slots is adapted for installation of the reversible base in a wall mounting orientation. The reversible base is preferably provided with arrows indicating directions of motion for insertion and removal. When the reversible base is oriented to a pair of slots and pushed in the direction indicated for installation, a positive lock occurs. The locking action is provided by pushing each tab over an internal ramp and over a molded protrusion. Removal of the base is accomplished by sliding the base in the opposite direction and removing the tabs from the slots.

A more complete understanding of the present invention, as well as further features and advantages of the invention, will be apparent from the following Detailed Description and the accompanying drawings.

DETAILED DESCRIPTION

Figure 1:
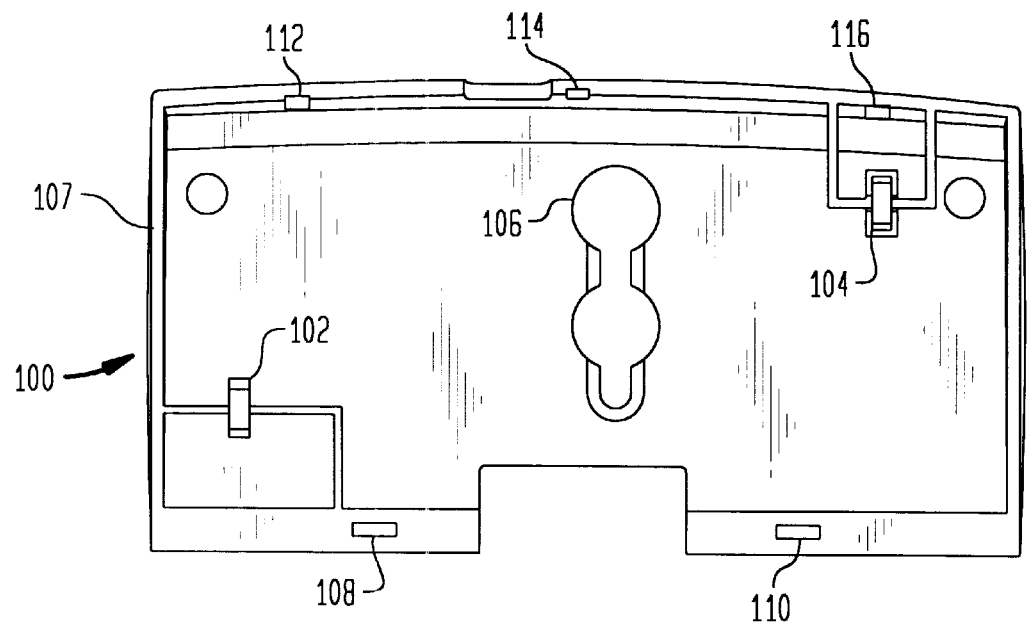
FIG. 1 is a top-down view of a reversible base according to the present invention.

FIG. 1 is a top-down view of a reversible base 100 according to the present invention. The base 100 includes first and second tabs 102 and 104 for insertion into matching slots of a housing 500 (illustrated in FIGS. 5 and 6). The base 100 also includes a hole 106 for wall mounting and alignment tabs 108–116 for alignment of the base 100 with a housing, such as the housing 500. The base further includes a mating surface 107, adapted to mate with the housing (illustrated in FIG. 5).

Figure 2:
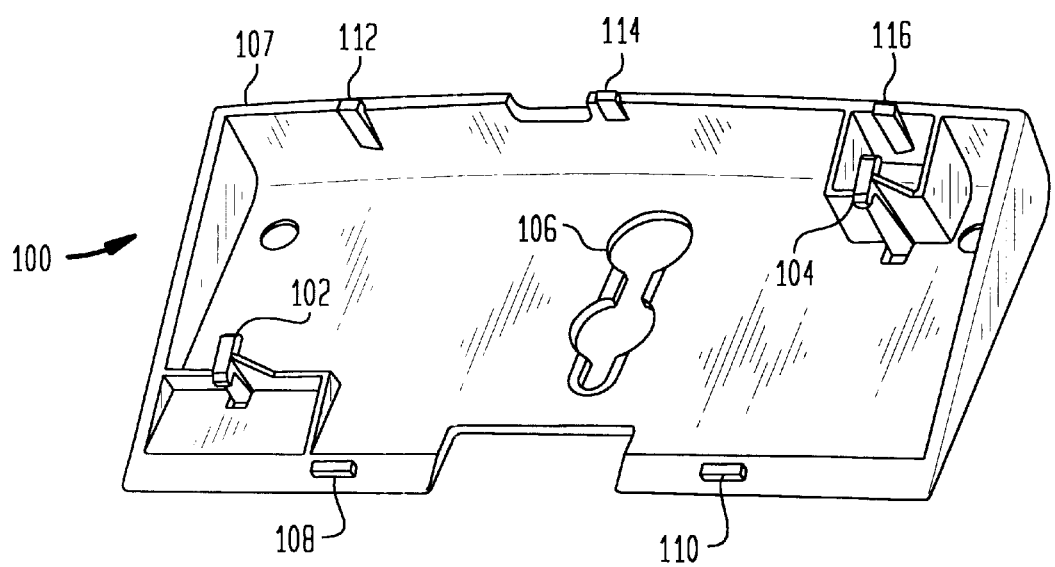
FIG. 2 is a perspective view of a reversible base according to the present invention.

FIG. 2 is a perspective view of the reversible base 100 according to the present invention, showing additional details of first and second tabs 102 and 104, hole 106, and tabs 108–116. Also visible is the mating surface 107 of the reversible base 100. Tabs 112, 114 and 116 are rear alignment tabs, and are used to keep an outside contour 117 of the base 100 flush with the housing as illustrated in FIG. 5.

Figure 3:
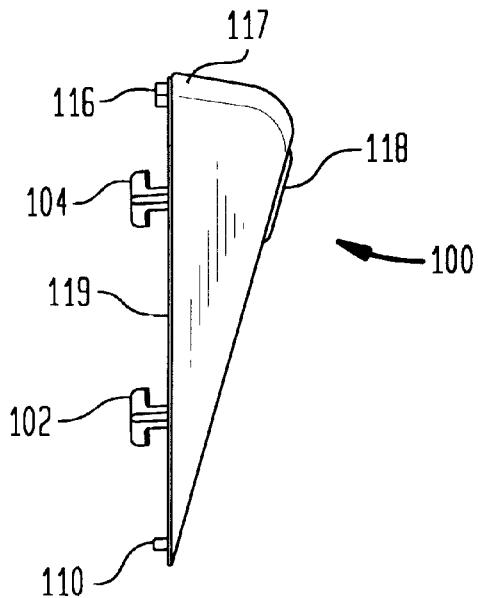
FIG. 3 is a side view of a reversible base according to the present invention.

FIG. 3 is a side view of the reversible base 100, showing tabs 102 and 104, with alignment tabs 110 and 116 also visible. FIG. 3 also shows a view of a surface 118 of the reversible base 100. The surface 118 is adapted to rest securely against a desk or wall, depending on the orientation of the reversible base 100.

Figure 4:
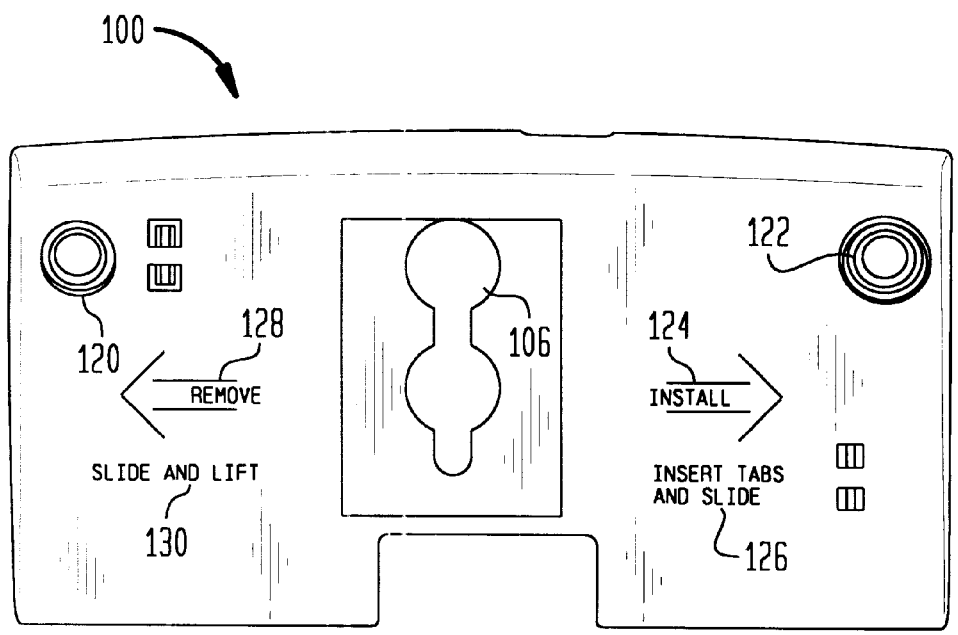
FIG. 4 is a bottom-up view of a reversible base according to the present invention.

FIG. 4 is a bottom-up view of the reversible base 100, showing additional details of the hole 106 and the surface 118. The surface 118 includes feet 120 and 122 for security in desktop placement. The surface 118 also includes installation arrow 124 and installation instructions 126, as well as removal arrow 128 and removal instructions 130. Reversal of the orientation of the base 100 will reverse the direction in which it is necessary to move the base 100, and will also reverse the orientation of the arrows 124 and 128, so that movement of the base 100 in the direction of the arrow 124 will accomplish installation, and movement in the direction of the arrow 128 will accomplish removal, regardless of the orientation of the base 100.

Figure 5:
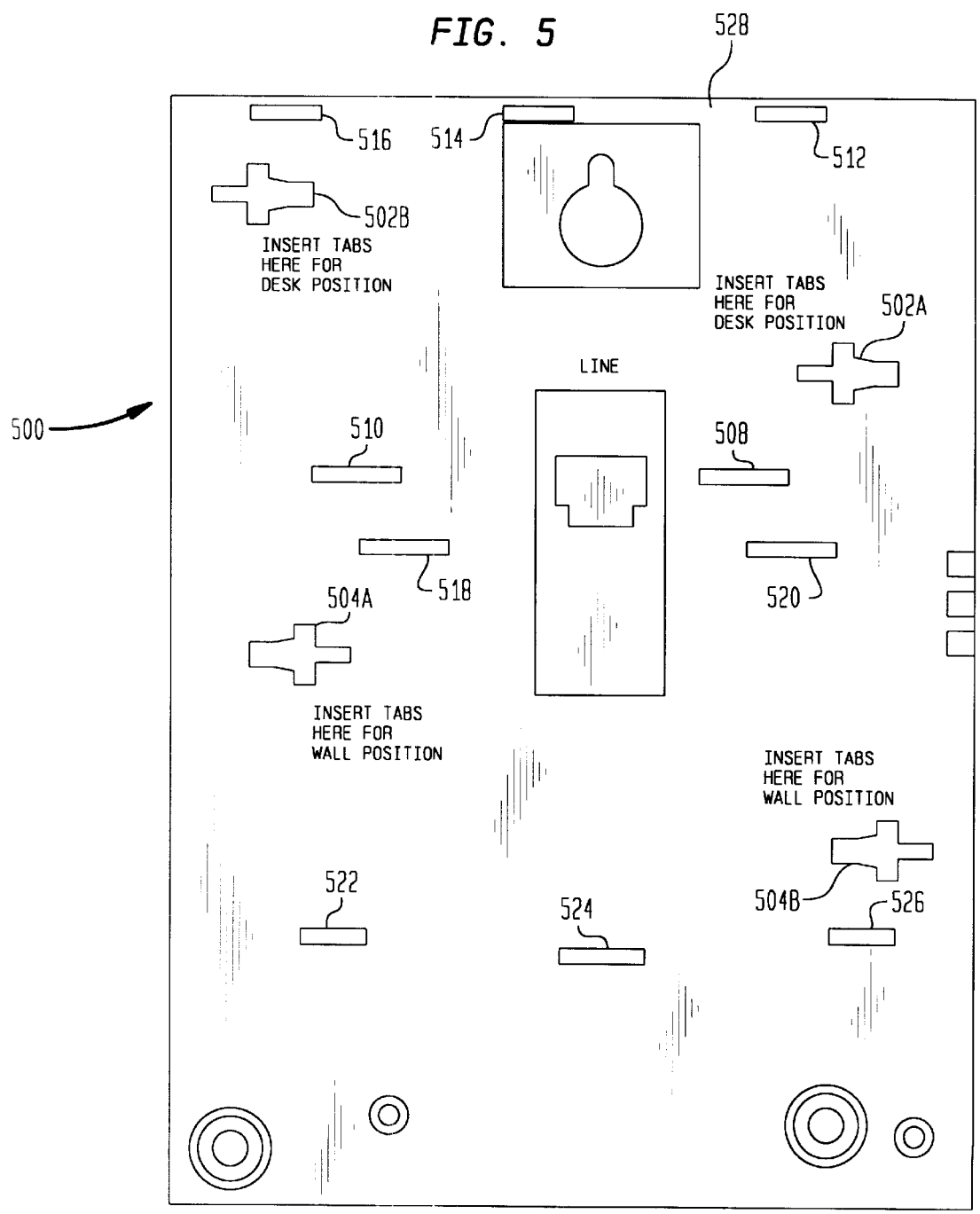
FIG. 5 is a bottom-up view of a housing according to the present invention.

FIG. 5 is a bottom-up view of the housing 500, illustrating slots 502A and 502B, for installation of the base 100 in a desktop orientation, and slots 504A and 504B for installation of the base 100 in a wall mounting orientation, as well as a hole 506 for wall mounting. When the base 100 is to be installed in a desktop orientation, tab 102 of the base 100 is inserted in slot 502A and tab 104 of the base 100 is inserted in slot 502B. When the base 100 is to be installed in a wall mounting orientation, tab 102 of the base 100 is inserted in slot 504A and tab 104 of the base 100 is inserted in slot 504B. The hole 506 is covered by the base 100 when the base 100 is installed for desk mounting. The housing 500 also includes alignment slots 508–516 for insertion of alignment tabs 108–116, respectively, of base 100 when the base 100 is to be installed in a desk mounting position.

The housing 500 also includes alignment slots 518–526, for insertion of alignment tabs 108–116, respectively, of base 100 when the base 100 is to be installed in a wall mounting position. The housing 500 also includes a surface 528 adapted for mating with the mating surface 107 of the base 100 as illustrated in FIG. 3.

Figure 6:
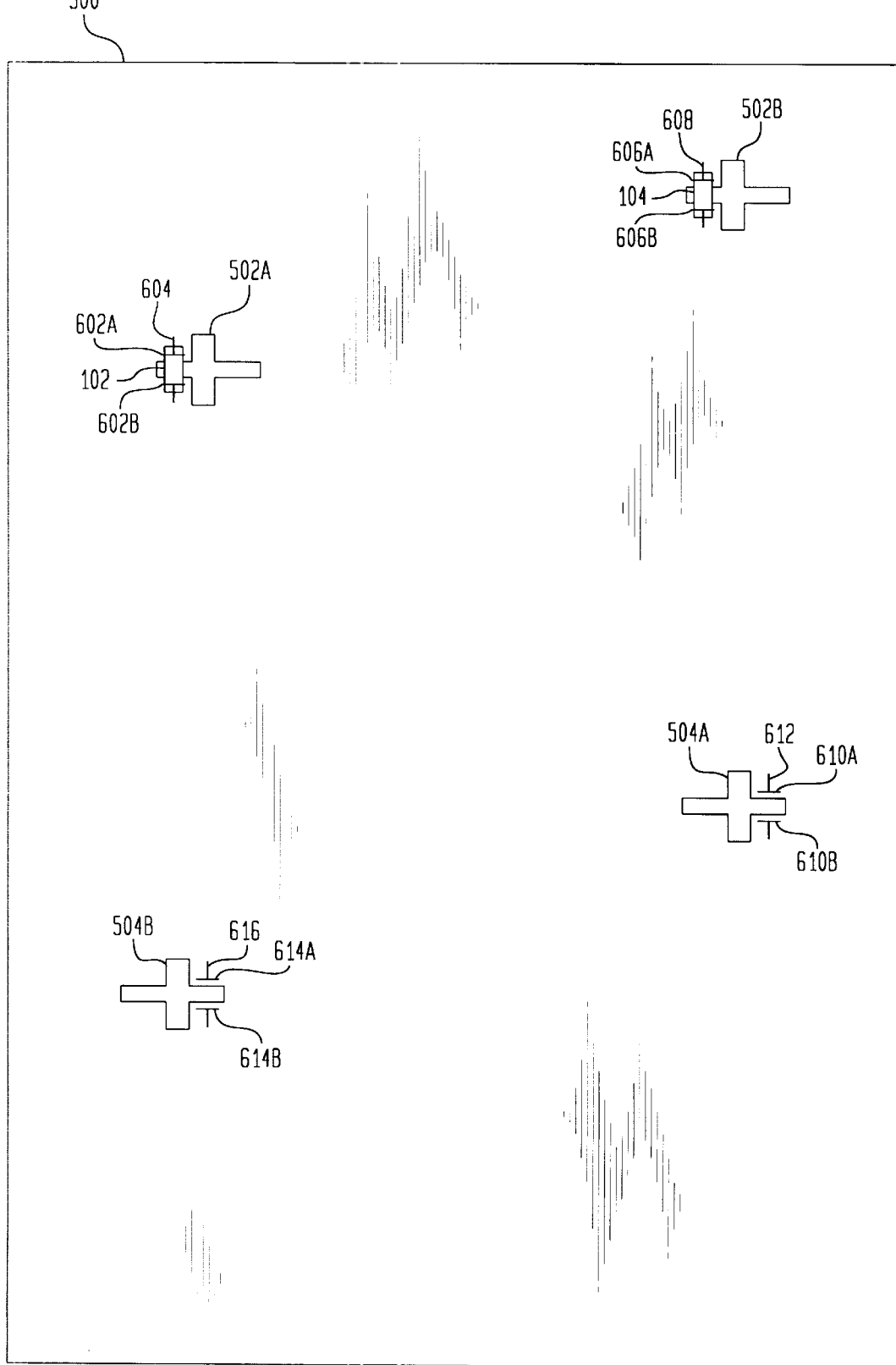
FIG. 6 is a view of looking inside a housing according to the present invention.

FIG. 6 is a view looking at the inside of the housing 500, with the base 100 installed in a desktop orientation. Tabs 102 and 104 can be seen to have been installed and locked in slots 502A and 502B, respectively. Tab 102 has been pushed up ramps 602A and 602B and over protrusion 604, while tab 104 has been pushed up ramps 606A and 606B and over protrusion 608. Pushing tab 102 up ramps 602A and 602B and over protrusion 604, and tab 104 up ramps 606A and 606B and over protrusion 608 has achieved a positive locking condition which provides security for the base 100, but from which the base 100 can be disengaged with a moderate application of pressure. The ramps 602A and 602B and the protrusion 604, and the ramps 606A and 606B and the protrusion 608 may be suitably designed so that a force of about 12 Netwons engages and disengages the tabs 102 and 104.

Slots 504A and 504B are also visible, opposite in orientation to slots 502A and 502B.

Ramps 610A and 610B and protrusion 612, are visible, as well as ramps 614A and 614B and protrusion 616. For a wall mount orientation, the tabs 102 and 104 are installed in slots 504A and 504B and locked in a similar manner as for a desktop orientation.

In order to install the base 100 in a desktop orientation, tabs 102 and 104 of the base 100 (illustrated in FIG. 1) are inserted into corresponding slots 502A and 502B in the housing 500 (illustrated in FIG. 5), sliding in the direction indicated. Because of industrial design constraints, alignment tabs 115, 116 and 118 (illustrated in FIG. 1) are used to ensure that the back contour 117 of the base 100 matches the contour of the housing 500 in slots 518, 519 and 520 (illustrated in FIG. 5), and to provide additional support. As the base 100 starts sliding, the underside of the tabs 102 and 104 engage the ramps 602A and 602B and 606A and 606B inside the housing 500. This ensures that the mating surface 107 fits securely against the housing 500. As the tabs 102 and 104 snap over the protrusions 604 and 608, this action provides a positive feedback to the customer indicating that the base 100 is installed correctly.

A similar procedure is followed for installation of the base 100 in a wall mounting orientation, with the base 100 being rotated and tabs 102 and 104 being inserted into slots 504A and 504B, respectively.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A telephone housing adapted for desk or wall mounting, comprising:
    a fixed base;
    a first and a second set of attachment slots in the fixed base, each set of attachment slots including one or more attachment slots, each attachment slot of the first set of attachment slots being oriented to accommodate a base installed for desk mounting, each attachment slot of the second set of attachment slots being oriented to accommodate a base installed for wall mounting;
    one or more ramps adjacent to each attachment slot, each of the ramps being adapted to facilitate movement of an attachment tab into and out of the locking position, each of the ramps having a lower end and an upper end, each of the ramps being adapted to guide the attachment tab into a position of maximum elevation as the tab is slid along the ramp from the lower end to the upper end of the ramp and into the locking position; and
    one or more protrusions adjacent to each attachment slot, each of the protrusions being adapted to provide a lock for an attachment tab as the attachment tab is moved into the locking position, each of the protrusions being further adapted to allow movement into and out of the locking position through the application of moderate pressure in an appropriate direction.

2. The housing of claim 1 wherein each of the sets of attachment slots is a pair of attachment slots.

3. The housing of claim 2 and also including a first and a second set of alignment slots for alignment of a reversible base, the first set of alignment slots being adapted to align the base installed in a desk mounting position, the second set of alignment slots being adapted to align the base installed in wall mounting position.

4. The housing of claim 3 wherein the second pair of attachment slots is oriented opposite from the first pair of attachment slots so that a 180-degree rotation of the base serves to change an orientation of the base from an orientation suitable for installation in the first pair of attachment slots to an orientation suitable for installation in the second pair of attachment slots.

5. A reversible base for installation in a housing of a telephone, comprising:
    a surface adapted to facilitate placement of the telephone on a generally flat, generally horizontal surface when the base is installed in the housing in a first orientation, or to facilitate placement of the telephone on a generally vertical surface when the base is installed in the housing in a second orientation; and
    a plurality of attachment tabs attached to the base, each attachment tab being adapted for insertion in a mating attachment slot of a housing, each tab having an uninterrupted generally flat surface for sliding along a ramp, each tab being further adapted to achieve a positive lock when slid up the ramp and over a protrusion associated with the attachment slot.

6. The base of claim 5, wherein the tabs include a first attachment tab and a second attachment tab.

7. The base of claim 6, wherein the attachment tabs are placed on the surface such that the tabs mate with a first pair of attachment slots of the housing when the base is attached to the housing in a first orientation and with a second pair of attachment slots, of the housing when the base is attached to the housing in a second orientation, the second orientation differing from the second orientation by a rotation of 180 degrees.

8. A reversible telephone mounting system, comprising:
    a housing having a first and a second set of attachment slots in the housing, each set of attachment slots including one or more attachment slots, each attachment slot of the first set of attachment slots being oriented to accommodate a base installed for desk mounting, each attachment slot of the second set of attachment slots being oriented to accommodate a base installed for wall mounting, the housing further including one or more ramps adjacent to each attachment slot, each of the ramps being adapted to facilitate movement of an attachment tab into and out of a locking position, each of the ramps having a lower end and an upper end, each of the ramps being adapted to guide the attachment tab into a position of maximum elevation as the tab is slid along the ramp from the lower end to the upper end of the ramp and into the locking position, and one or more protrusions adjacent to each attachment slot, each of the protrusions being adapted to provide a lock for an attachment tab as the attachment tab is moved into the locking position, each of the protrusions being further adapted to allow movement into and out of the locking position through the application of moderate pressure in an appropriate direction; and
    a reversible base including a surface adapted to facilitate placement of the telephone on a generally flat, generally horizontal surface when the base is installed in the housing in a first orientation, or to facilitate placement of the telephone on a generally vertical surface when the base is installed in the housing in a second orientation and a plurality of tabs attached to the base, each tab being adapted for insertion in a mating slot of a housing, each tab having an uninterrupted generally flat surface for sliding along a ramp, each tab being further adapted to achieve a positive lock when slid up a ramp and over a protrusion associated with the slot.

9. The housing of claim 1 wherein each of the ramps is adapted to facilitate movement of a corresponding attachment tab up the ramp, each ramp giving the corresponding attachment tab a component of travel generally perpendicular to a surface on which the ramp is located, the perpendicular component of travel imparted by the ramp allowing the attachment tab to pass over a corresponding protrusion into a locking position against the corresponding protrusion.

10. The base of claim 7 and also including a set of aligmnent tabs for alignment of the base, each tab of the set of alignment tabs being adapted to mate with a corresponding alignment slot in the housing.

11. The telephone system of claim 8 wherein each of the ramps is adapted to facilitate movement of a corresponding attachment tab up the ramp, each ramp giving the corresponding attachment tab a component of travel generally perpendicular to a surface on which the ramp is located, the perpendicular component of travel imparted by the ramp allowing the attachment tab to pass over a corresponding protrusion into a locking position against the corresponding protrusion.

12. The telephone system of claim 11 wherein the housing includes a first and a second set of alignment slots for alignment of the reversible base, the first set of alignment slots being adapted to align the base installed in a desk mounting position, the second set of alignment slots being adapted to align the base installed in wall mounting position and wherein the base includes a set of alignment tabs for alignment of the base, each tab of the set of alignment tabs being adapted to mate with a corresponding slot in the housing.

13. A method of attaching and removing a reversible base to and from a telephone housing, comprising the steps of:

inserting a pair of attachment tabs into a corresponding pair of attachment slots in the housing; and sliding the base so that each attachment tab slides along a ramp adjacent to a corresponding one of the attachment slots, the tab sliding from a lower end of the ramp to an upper end of the ramp past a protrusion adjacent to the corresponding one of the attachment slots in order to lock the tabs against the protrusions, the tab achieving a position of maximum elevation at a locking position at the upper end of the ramp.

14. The method of claim 13 wherein each of the ramps gives a corresponding attachment tab a component of travel generally perpendicular to a surface on which the ramp is located, the perpendicular component of travel imparted by the ramp allowing the attachment tab to pass over a corresponding protrusion into a locking position against the corresponding protrusion.

15. The method of claim 14 and also including the steps of applying pressure against the base in a direction opposite to the direction in which the base was slid during attachment of the base so as to slide the attachment tabs past the protrusions in order to unlock the attachment tabs, and removing the attachment tabs from the attachment slots.

16. The method of claim 15 wherein the step of inserting the attachment tabs into the attachment slots includes inserting the attachment tabs into a first pair of attachment slots when it is desired to attach the base for desktop mounting and wherein the step of inserting the attachment tabs into the attachment slots includes inserting the attachment tabs into a second pair of attachment slots in an orientation rotated 180 degrees from the first pair of attachment slots when it is desired to attach the base for wall mounting.

17. The method of claim 16 wherein the step of inserting the attachment tabs into the attachment slots is followed by a step of inserting a set of alignment tabs into a corresponding set of alignment slots.

* * * * *